April 25, 1961   J. L. IRWIN   2,981,539
COMBINED END STOP AND STEADYING DEVICE
Filed Feb. 28, 1958

INVENTOR.
John L. Irwin
BY Barthel & Bugbee
Attys

United States Patent Office 2,981,539
Patented Apr. 25, 1961

2,981,539

COMBINED END STOP AND STEADYING DEVICE

John L. Irwin, 1721 Vinewood Ave., Detroit 16, Mich.

Filed Feb. 28, 1958, Ser. No. 718,240

4 Claims. (Cl. 269—192)

This invention relates to hack saws and, in particular, to stop devices for such hack saws.

Hitherto, conventional power hacksaws have been provided with vises for holding shafting or bar stock to be sawed, with the forward end of the stock engaging the end of a stop rod disposed parallel to the axis of the bar stock and mounted in an up-right on a carriage adjustably slidable along parallel guide rods disposed perpendicular to the sawing plane. As long as the shaft or bar stock is sufficiently elongated, this work holding and stop mechanism is satisfactory. When, however, the piece of shaft or bar stock becomes so short, after successive sawings, as to have a length approximately equal to or less than its diameter, the short piece of stock wobbles in the vise during sawing, because of the fact that its entire length is not engaged by the entire width of the clamping jaws of the vise, with the result that such short pieces of stock cannot be accurately or satisfactorily sawed. As a result, this condition has hitherto created a large wastage of short lengths of shaft or bar stock which are useless for any purpose other than scrap.

The present invention provides a combined auxiliary work stop and steady rest fixture for the shaft or bar stock which is attachable to the conventional stop rod, thereby enabling very short pieces of such stock to be rigidly held and satisfactorily sawed, even though incapable of being handled in a conventional power hacksaw vise in the usual way.

Accordingly, one object of the present invention is to provide a combined auxiliary stop and steady rest fixture for a power hacksaw, adapted to engage the projecting end of a short workpiece in such a manner as to hold the workpiece absolutely steady and immovable during sawing, as well as to accurately fix the length of stock to be sawed off, even though the remaining portion of the stock is so short as to be held between a part only of the width of the vise jaws.

Another object is to provide a combined auxiliary stop and steady rest fixture of the foregoing character which is attachable to the end of the conventional stop rod ordinarily provided on power hacksaws but which is in itself incapable of preventing wobbling of an excessively short workpiece in the hacksaw vise.

Another object is to provide a combined auxiliary stop and stead rest fixture of the foregoing character which has an end abutment plate engageable with substantially the entire end surface of the workpiece so as to exert a sufficient leverage thereon, in cooperation with the clamping action of the vise jaws, to maintain the excessively short workpiece without wobbling in an accurately axial position perpendicular to the plane of sawing, Another object is to provide a combined auxiliary stop and stead rest fixture of the foregoing character, as set forth in the object immediately preceding, wherein the end abutment plate is adjustably mounted relatively to the remainder of the device in order to enable it to be quickly and easily adjusted into accurate parallelism with the plane of sawing.

Other objects and advantages of the invention will become apparent during the course of the following description of the accompanying drawings, wherein.

Figure 1:
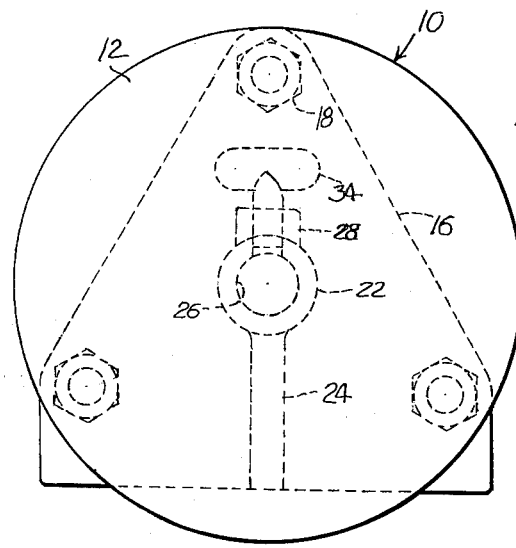
Figure 1 is a left-hand end elevation of a combined auxiliary stop and steady rest fixture, according to one form of the invention.
Figure 2:
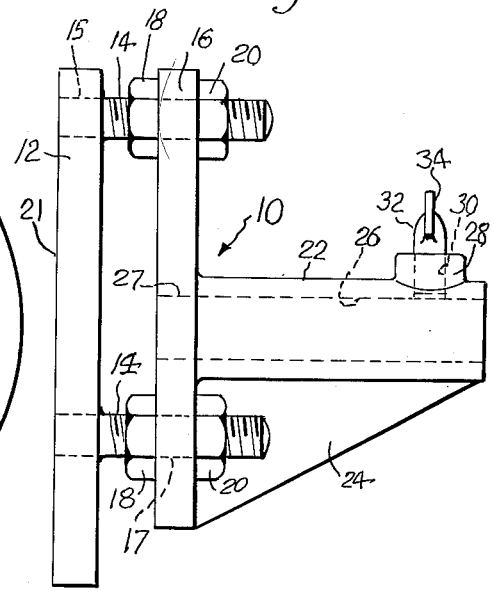
Figure 2 is a side elevation of the device shown in Figure 1.

Referring to the drawings in detail, Figures 1 and 2 show a combined auxiliary stop and steady rest fixture, generally designated 10, according to one form of the invention as including a circular work end abutment disc 12 which is adjustably secured by threaded parallel studs 14 seated therein as at 15 to an approximately triangular supporting plate 16 having holes 17 therefor and locked in adjusted spaced relationship therewith by lock nuts 18 and 20 threaded upon studs 14 on opposite sides of the triangular supporting plate 16. The work end abutment disc 12 has a flat abutment surface 21. Welded or otherwise secured to the rearward face of the supporting plate 16 substantially at right angles thereto is a tubular support or hub 22 braced by an approximately triangular longitudinally-extending brace plate 24 welded at its vertical end to the supporting plate 16 and along its horizontal side to the tubular support 22. The tubular support 22 has a longitudinal socket bore 26 therein, the axis of which is disposed accurately perpendicular to the supporting plate 16 and which is aligned with a corresponding bore 27 in the later. The tubular support 22 on its upper side is provided with a boss 28 which is bored and threaded as at 30 transversely to the axis of the bore 26. Threaded into the threaded bore 30 is the threaded shank 32 of a locking set screw 34, such as a wing screw.

Figure 3:
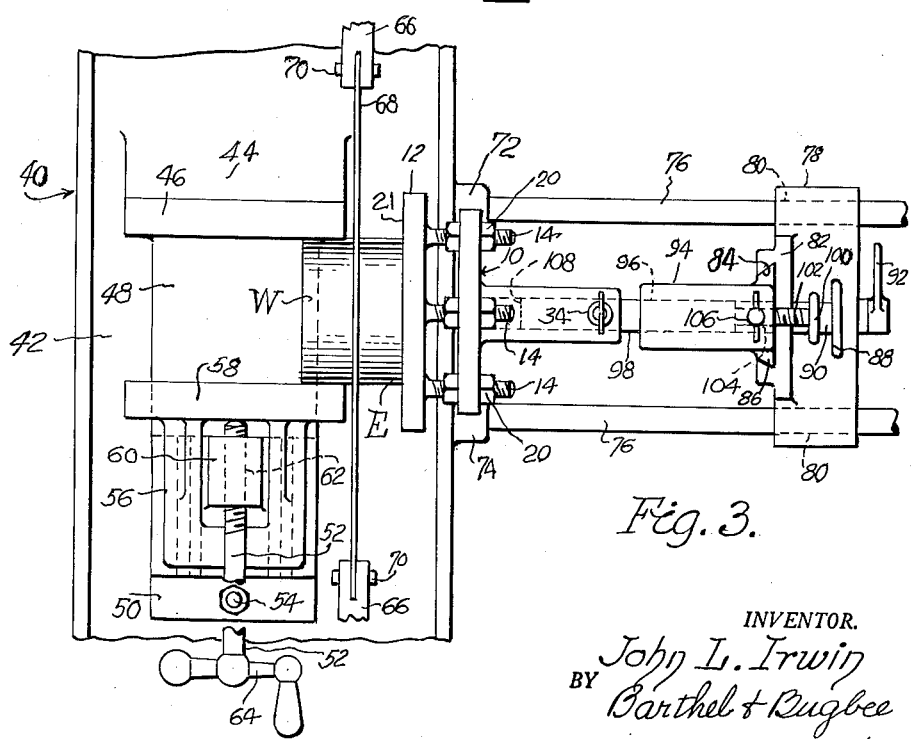
Figure 3 is a top plan view of the device of Figures 1 and 2, shown as mounted upon the stop rod of a conventional power hacksaw, with an excessively short workpiece clamped between the vise jaws thereof in engagement with the auxiliary stop and steady rest of the present invention.

The combined auxiliary stop and steady rest fixture 10 of the present invention is attached to and used in connection with a conventional power hacksaw, generally designated 40, the adjacent portions of which are shown in top plan view in Figure 3. The power hacksaw 40 and its details are well-known to those skilled in the mechanical arts and its details are beyond the scope of the present invention. The power hacksaw 40 is merely one of several types in connection with which the fixture 10 of the present invention may be successfully used, and is shown solely for purposes of illustration and is not to be considered as limiting the use of the fixture to the particular machine shown.

The power hacksaw 40, in so far as it needs to be shown for the purposes of illustrating the application and use of the fixture 10 of the present invention, includes a bed 42 having thereon an upstanding portion 44 carrying a stationary vise jaw 46. The bed 42 is also provided with a guideway 48 preferably of dove-tail cross-section terminating at one end in an upstanding post 50 bored to rotatably support the plain outer end portion of a screw shaft 52 annularly grooved and held against end motion by a set screw 54. Reciprocably mounted upon the guideway 48 is a carriage 56 carrying a movable vise jaw 58, the carriage 56 having a central bridge portion 60 which is bored and threaded as at 62 to threadedly receive the inner threaded end of the screw shaft 52. Mounted on the outer end of the screw shaft 52 is a hand crank 64 by means of which the screw shaft 52 is rotated in order to move the carriage 56 and movable jaw 58 along the guideway 48 toward and away from the fixed jaw 46 in order to accommodate different thicknesses or diameters of workpieces W.

Mounted above the bed 42 is an approximately C-shaped reciprocatory hacksaw holder 66, only the opposite ends of which are shown, but which are understood to be interconnected in the usual way above the plane of the upper ends of the vise jaws 46 and 58 and reciprocated by conventional power-driven mechanism to reciprocate the hacksaw blade 68 secured thereto by means of the pins 70. The hacksaw blade 68 is also conventional and has the usual teeth along its lower edge engageable with the workpice W. The plane of the hacksaw blade 68 is ordinarly disposed perpindicular to the plane of the inner surfaces of the vise jaws 46 and 58 and also perpendicular to the axis of the workpiece W clamped between them.

The bed 40 is provided on one side with bosses 72 and 74 bored to receive the inner ends of parallel guide shafts or rods 76 interconnected at their outer ends by a bridge member (not shown). In order to maintain them in parallelism, the bridge member ordinarily extends downward to the floor and carries levelling screws. Slidably mounted for travel along the guide rods 76 is a carriage 78 having parallel bores 80 for slidably receiving the guide rods 76. The carriage 80 is provided with an upstanding post 82 provided with a guide groove or guideway 84 also preferably of dovetail cross-section and disposed in a vertical direction. Slidably mounted in the guideway 84 is a dovetail slide 86 which is clamped in its vertically-adjusted position by a hand wheel 88 on the end of a clamping screw 90. The carriage 78 is clamped in its adjusted position on the guide rods 76 by a hand lever 92 mounted on the end of a clamping screw (not shown). Mounted on the upper end of the slide 86 and integral therewith is a horizontally-disposed elongated approximately cylindrical boss 94 having a bore 96 therein disposed perpendicular to the sawing plane of the hacksaw 68 and having a stop rod 98 reciprocably mounted therein and moved to and fro by means of a hand wheel 100 on the end of a screw shaft 102 threaded through a threaded horizontal bore 104 in the rearward end of the boss 94. A set screw 106 threaded into the threaded bore 104 at right angles thereto locks the adjusting screw shaft 102 in its adjusted position. The stop rod or shaft 98 has an end surface 108 which is disposed accurately parallel to the sawing plane of the hacksaw 68.

In the operation of the invention, the tubular support or hub 22, the socket bore 26 of which snugly but slidably receives the stop rod or shaft 98, is slid onto the end thereof and locked in position by the locking set screw 34. It will be assumed that the end abutment plate or disc 12 has been adjusted by means of the lock nuts 18 and 20 to place its front or abutment surface 21 accurately parallel to the sawing plane of the hacksaw blade 68. Let it also be assumed that an excessively short workpiece W, incapable of being accurately sawed in the ordinary manner, has been placed between the vise jaws 46 and 58 and clamped in position by rotating the hand wheel 64.

The fixture 10 is moved toward or away from the cutting plane of the hacksaw blade 68 until its abutment surface 21 is disposed at the separation from the adjacent side of the hacksaw blade 68 the desired thickness of the piece to be cut from the workpiece W which, for purposes of example, is considered to be a short piece of large diameter shafting. The vise jaws 46 and 58 are loosened sufficiently to permit the workpiece W to be moved axially until its outer end engages the abutment surface 21 of the abutment disc 12 in face-to-face contact over its entire end surface E. The vise jaws 46 and 58 are then tightened upon the workpiece W which is thereby held firmly at three points of engagement, namely at its lines of contact with the vise jaws 46 and 58 and its surface of contact between its end surface E and the abutment surface 21 of the abutment disc 12. The various clamping screws having been tightened to lock the various parts of the carriage 78 such as the hand lever 92, the hand wheels 88 and 100 and the set screws 106 and 34, the operator starts the machine in operation to cause the hacksaw holder 66 and hacksaw 68 to reciprocate, sawing a groove or kerf through the workpiece W. At the same time, however, the workpiece W is prevented from tilting or wobbling, as it ordinarly would do because of its small and offset contact with the vise jaws 46 and 58, by the firm abutment of its end surface E with the abutment surface 21 of the end abutment disc 12 which acts as a steady rest preventing any such wobble. The large area of contact between the abutment surface 21 and the end E of the workpiece W imparts such a powerful leverage to the workpiece W as to prevent such tilting or wobbling, with the result that short pieces of stock can be salvaged and additional workpieces obtained from them where such short pieces previously had to be rejected as scrap. In this manner, much of the stock which previously had to be discarded at the end of a long piece of bar or shaft stock can now be reclaimed by the use of the fixture 10 of the present invention.

What I claim is:

1. For attachment to one end of the conventional work end stop rod of a conventional power hacksaw machine, a combined auxiliary work end stop and steadying device comprising an elongated hollow supporting hub structure having an elongated longitudinal socket bore therein with a configuration adapted to snugly but slidably receive one end of the stop rod, a work end abutment structure mounted on said hub structure in supported relationship therewith, said abutment structure having a substantially flat work end abutment surface disposed perpendicular to the axis of the bore of said hub structure, and means on one of said structures adapted to fixedly yet releasably secure said one structure to the stop rod.

2. A combined auxiliary work end stop and work steadying device, according to claim 1, wherein the abutment structure includes a stationary plate fixedly secured to said hub structure, a movable plate disposed substantially parallel to said stationary plate, adjustment means for adjustably tilting said movable plate out of parallelism relatively to said stationary plate, and locking elements releasably securing said adjustment means to said stationary plate.

3. A combined auxiliary work end stop and work steadying device, according to claim 2, wherein the adjustment means includes threaded adjustment members fixedly secured to said movable plate and threadedly connecting said movable plate to said stationary plate.

4. A combined auxiliary work end stop and works steadying device, according to claim 2, wherein the adjustment means includes threaded adjustment members fixedly secured to said movable plate and disposed in a substantially triangular arrangement upon substantially parallel axes disposed substantially equidistant from the axis of said hub bore and threadedly connecting said movable plate to said stationary plate.

References Cited in the file of this patent

UNITED STATES PATENTS

| 186,262 | McAleer | Jan. 16, 1877 |
| 785,699 | Bemis | Mar. 21, 1905 |
| 836,006 | Bemis | Nov. 13, 1906 |
| 2,791,823 | Espari et al. | May 14, 1957 |